United States Patent
Jones et al.

[19]

[11] Patent Number: 6,085,581
[45] Date of Patent: Jul. 11, 2000

[54] METHOD FOR ACCURATELY POSITIONING A DEVICE AT A DESIRED AREA OF INTEREST

[75] Inventors: Gary D. Jones, Tijeras; Jack E. Houston; Kenneth T. Gillen, both of Albuquerque, all of N. Mex.

[73] Assignee: Sandia Corporation, Albuquerque, N. Mex.

[21] Appl. No.: 09/195,565

[22] Filed: Nov. 18, 1998

[51] Int. Cl.⁷ .............................. G01B 5/28; G01B 7/34
[52] U.S. Cl. ................. 73/105; 73/1.79; 73/1.89
[58] Field of Search .................. 73/1.79, 1.81, 73/1.89, 105; 250/306, 307

[56] References Cited

U.S. PATENT DOCUMENTS

| | | | |
|---|---|---|---|
| 4,785,177 | 11/1988 | Besocke | 250/306 X |
| 4,999,495 | 3/1991 | Miyata et al. | 250/306 |
| 5,142,145 | 8/1992 | Yasutake | 250/306 |
| 5,453,616 | 9/1995 | Wakiyama | 250/306 |
| 5,650,614 | 7/1997 | Yasutake et al. | 250/234 |
| 5,656,769 | 8/1997 | Nakano et al. | |
| 5,689,063 | 11/1997 | Fujio et al. | 73/105 |
| 5,705,814 | 1/1998 | Young et al. | 250/306 |
| 5,852,232 | 12/1998 | Samsavar et al. | 73/105 |
| 5,955,661 | 9/1999 | Samsavar et al. | 73/105 |

OTHER PUBLICATIONS

Griffith, J. E. et al., "Dimensional Metrology with Scanning Probe Microscopes", J. Appl. Phys., vol. 74, No. 09, Nov. 01, 1993, pp. R83–R109.

Yasutake, M. e tal., "Scanning Tunneling Microscope Combined with Optical Microscope for Large Sample Measurement", J. Vac. Sci. Technol. A., vol. 08, No. 01, Jan./Feb. 1990, pp. 350–353.

*Primary Examiner*—Daniel S. Larkin
*Attorney, Agent, or Firm*—George H. Libman

[57] ABSTRACT

A method for positioning a first device utilizing a surface having a viewing translation stage, the surface being movable between a first position where the viewing stage is in operational alignment with a first device and a second position where the viewing stage is in operational alignment with a second device. The movable surface is placed in the first position and an image is produced with the first device of an identifiable characteristic of a calibration object on the viewing stage. The moveable surface is then placed in the second position and only the second device is moved until an image of the identifiable characteristic in the second device matches the image from the first device. The calibration object is then replaced on the stage of the surface with a test object, and the viewing translation stage is adjusted until the second device images the area of interest. The surface is then moved to the first position where the test object is scanned with the first device to image the area of interest. An alternative embodiment where the devices move is also disclosed.

25 Claims, 3 Drawing Sheets

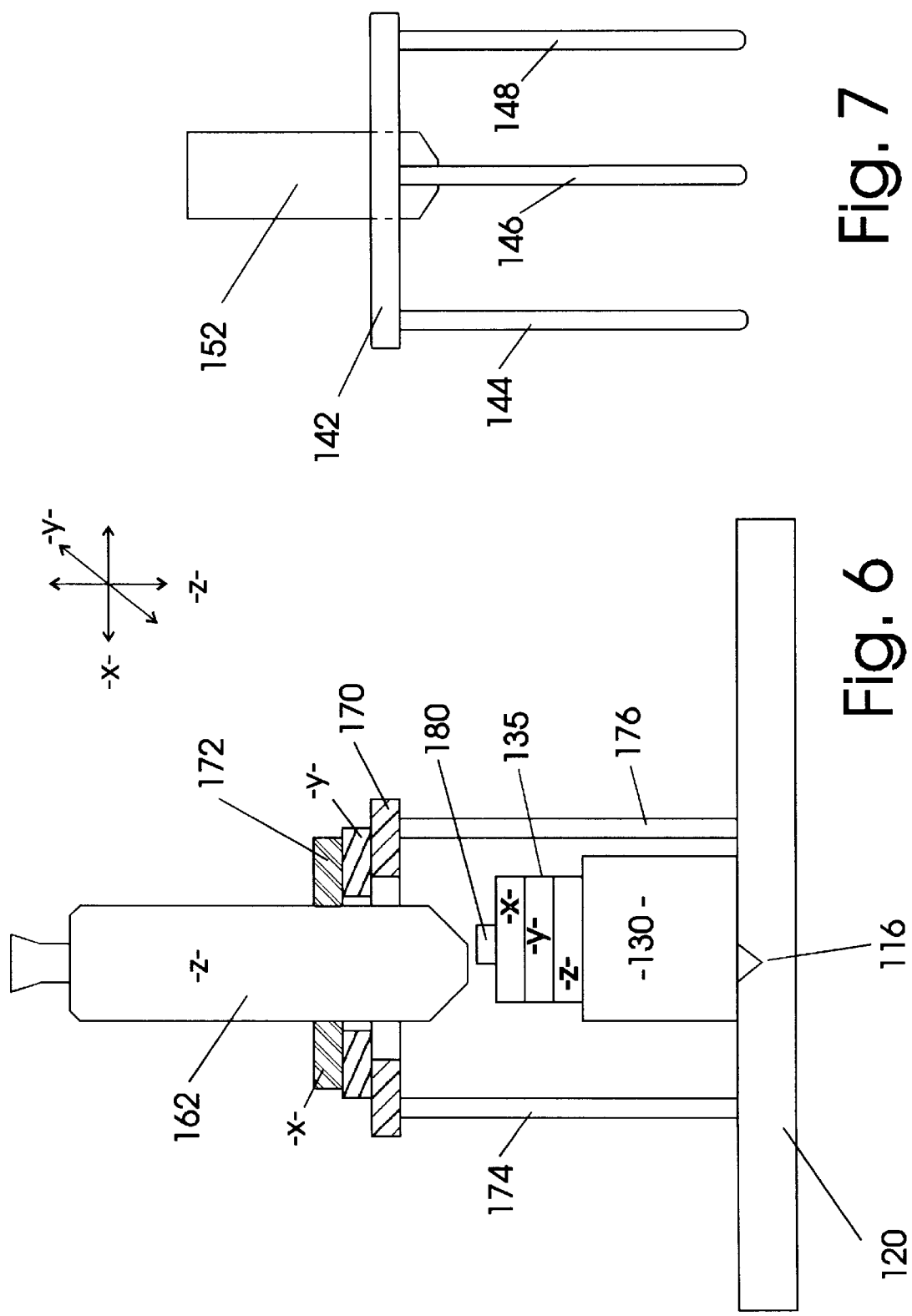

METHOD FOR ACCURATELY POSITIONING A DEVICE AT A DESIRED AREA OF INTEREST

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

Although a microscope may provide a very clear image of a very small portion of a surface, utilization of the microscope often requires the operator to be certain which small portion of the surface is being imaged. For optical microscopes, the operator may utilize a plurality of magnifications whereby the lowest magnification enables the desired area to be located, and the highest magnification enables that area to be closely observed. However, modern force microscopes, such as the atomic force microscope (AFM) and the interfacial force microscope (IFM), systematically move a very small probe over a surface and use a computer to produce an image representative of micron-level movement of the probe. Such devices are not capable of giving a low magnification view of the area under observation, and their probe tip is too small to observe with the naked eye or high magnification optical microscopes. If the tip position is not accurately determined, the location of the area under observation is not accurately determined. Other techniques must be used for the proper placement of such microscopes.

U.S. Pat. No. 5,650,614 of Yasutake et al discloses a system where an optical microscope is focused on a surface a distance from the probe of an AFM. The subject under test is placed under the optical microscope and examined at about 5x and then 50x so a bright spot can be centered in the optical axis. The subject is then translated the known distance between the microscopes so it is under the probe of the AFM. Aligning accuracy is stated to be on the order of 100 $\mu$m. The accuracy of this device depends on the accuracy with which the position of the probe is determined.

U.S. Pat. No. 5,689,063 of Fujiu et al. discloses another method for aligning AFM by having a specially designed AFM axially aligned with the objective lens of an optical microscope. This patent requires custom construction of both the force microscope and the optical microscope.

SUMMARY OF THE INVENTION

In accordance with this invention, a system is provided where a device having a very narrow field of view, such as a force microscope, may be very precisely located on a surface under test by providing a second device with a wider field of view, such as an optical microscope, that images an area which encompasses the field of view of the force microscope. The system is calibrated by first locating the unique characteristic of a test object with the force microscope, and then moving the optical microscope until it sees the same characteristic. The test object is then replaced with an object under test which is moved until the desired area is viewed by the optical microscope. The desired area is then viewed by the force microscope.

The present invention may comprise a method for positioning an area of interest relative to a first device, the method comprising the steps of placing a calibration object having an identifiable characteristic on a viewing stage on a platform; aligning the object with the first device; and producing an image of the identifiable characteristic with the first device. The object is then aligned with a second device and only the second device is moved until it produces an image of the identifiable characteristic that matches the image from the first device. The calibration object is then replaced on the viewing stage with a test object; and only the viewing stage is moved until the second device produces an image of the area of interest. The first device is then aligned with the object and an image of the area of interest is produced with the first device.

More specifically, the invention may be a method for positioning a first device utilizing a surface having a viewing translation stage, the surface being movable between a first position where the viewing stage is in operational alignment with a first device and a second position where the viewing stage is in operational alignment with a second device. The movable surface is placed in the first position and an image is produced with the first device of an identifiable characteristic of a calibration object on the viewing stage. The moveable surface is then placed in the second position and only the second device is moved until an image of the identifiable characteristic in the second device matches the image from the first device. The calibration object is then replaced on the stage of the surface with a test object, and the viewing translation stage is adjusted until the second device images the area of interest. The surface is then moved to the first position where the test object is scanned with the first device to image the area of interest.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 6 shows a representation of an alternative embodiment of the invention.

FIG. 7 shows the force microscope of the alternative embodiment.

DETAILED DESCRIPTION OF THE INVENTION

Figure 1:
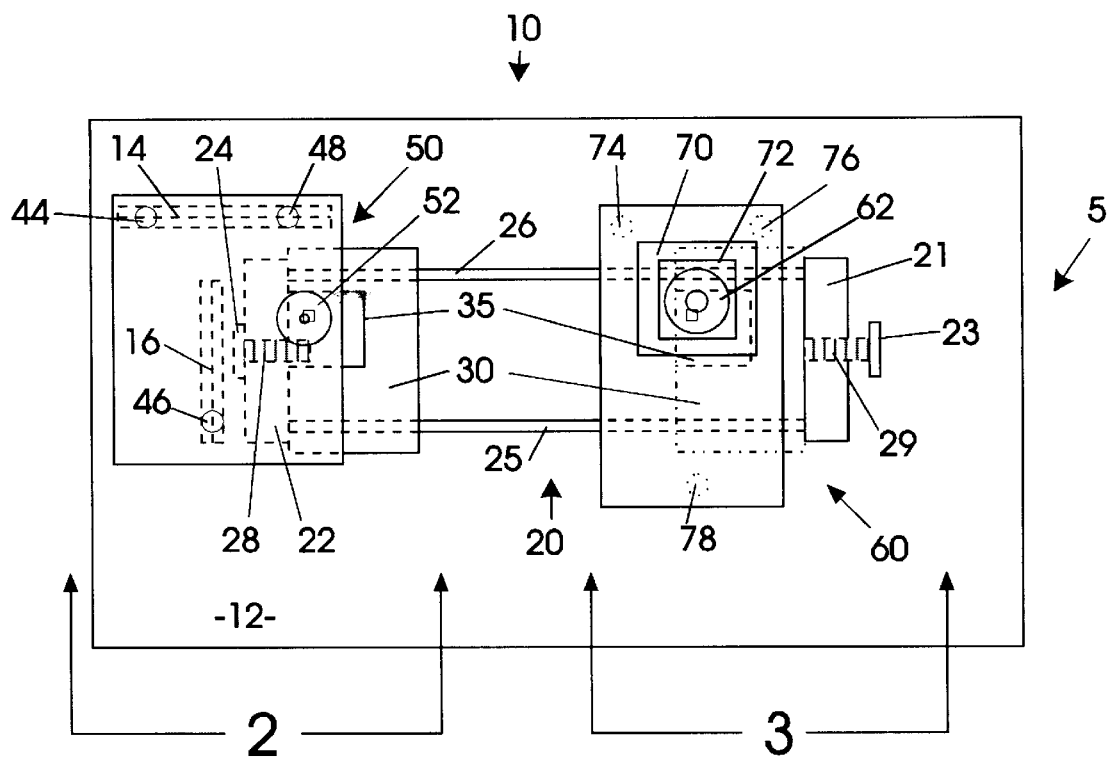
FIG. 1 shows a top view of a schematic representation of a preferred embodiment of the invention.
Figure 2:
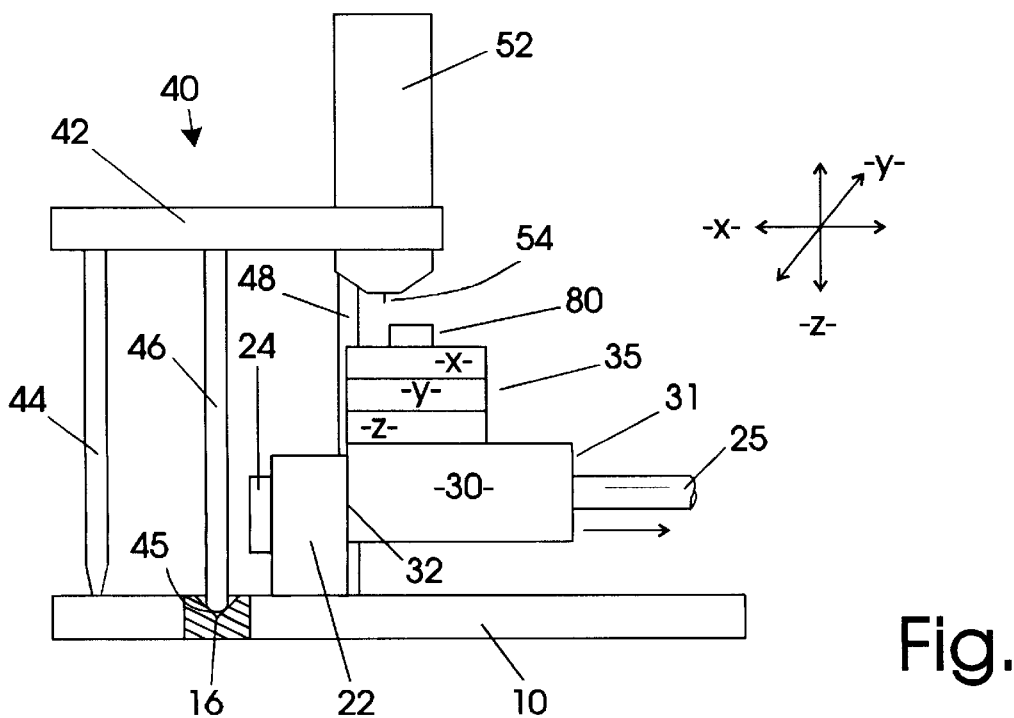
FIG. 2 shows a side view of the portion of FIG. 1 containing the force microscope.
Figure 3:
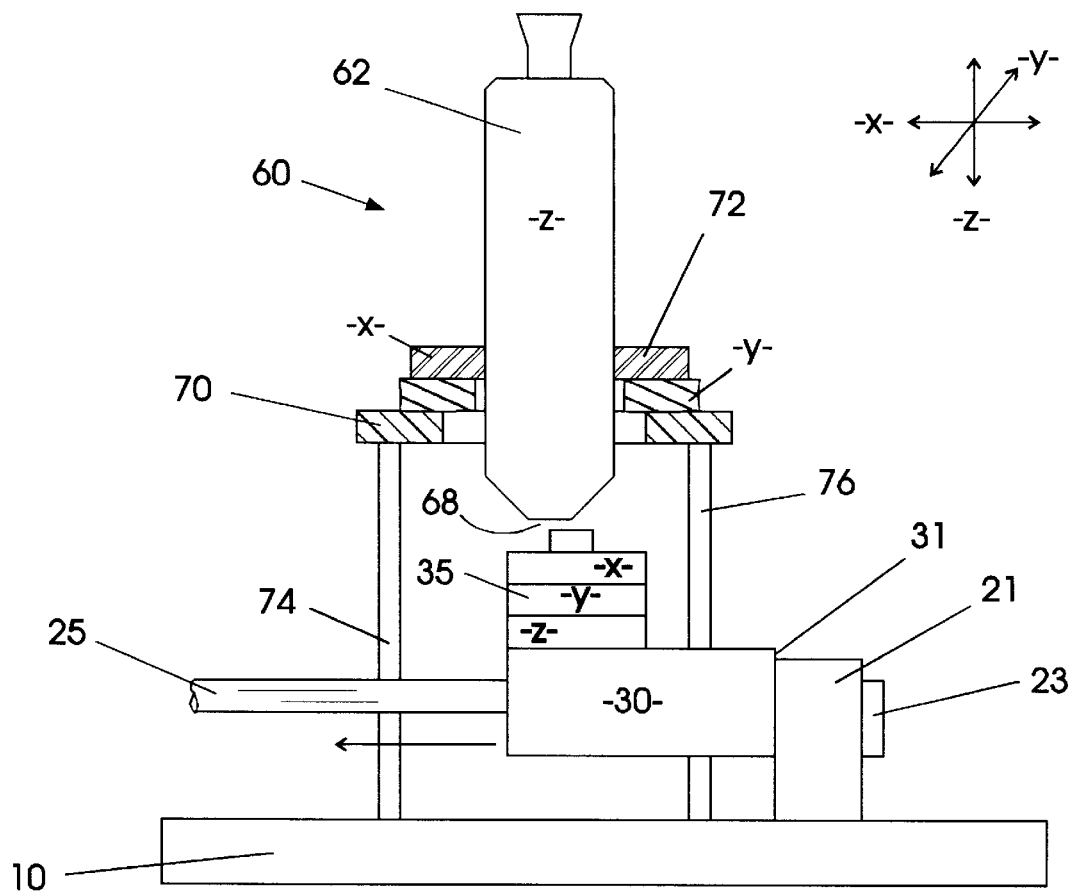
FIG. 3 shows a side view of the portion of FIG. 1 containing the optical microscope.

In accordance with a preferred embodiment of the invention, as shown in FIGS. 1–3, a three dimensional two location reference positioner 5 includes a base 10 containing a force microscope assembly 50 including force microscope 52 at a first location and an optical microscope assembly 60 including optical microscope 62 at a second location spaced from force microscope 52. A moveable platform 30 travels on connecting structure 20 between a first position in operational communication with force microscope 52 to a second location in operational communication with optical microscope 62.

Force microscope assembly 50 preferably includes a base 40 holding force microscope 52. Base 40 includes a first platform 42 having an opening in which microscope 52 is attached and at least three legs 44, 46, 48 extending to upper surface 12 of base 10. While legs 44, 46, 48 may be rigidly affixed to base 10, in the preferred embodiment they form a kinematic mount on base 10 which enables force microscope assembly 50 to be removed from base 10 for maintenance and accurately replaced in the same position on base 10.

To provide the kinematic mount, legs 44, 46, 48 are provided with rounded ends 45 that make 2-point contact with v-grooves 14 and 16. Motion in the x-direction is limited by front leg 46 in v-groove 16, and motion in the y-direction is limited by back legs 44, 48 in v-groove 14, which is perpendicular to v-groove 16.

Force microscope 52 may be an AFM or IFM, or any other type of very-high magnification surface sensing microscope. Such microscopes conventionally have a micrometer for moving the microscope in the z-direction so the microscope probe can be placed in position at or adjacent the surface under test for a measurement, and then retracted to protect the probe while the surface under test is serviced. Since the probe movement in the vertical direction is typically on the order of 100 microns, placement of the probe near the surface under test typically takes many repetitive approaches and withdrawals of the probe. For making a measurement, the microscope may be scanned in the x and y directions, much in the manner of a television raster, and/or the sample under test may be moved in the x and y directions.

Microscope assembly 60 preferably includes a platform 70 having a device translation stage such as x-y stage 72 for incremental movement of microscope 62 parallel to base 10. Platform 70 is either affixed to platform 10 by rigid legs 74, 76, 78, as shown, or by another kinetic mount (not shown).

Surface under test 80 is placed on an motorized x-y-z stage 35 on moveable platform 30 for precision placement as discussed hereinafter. Connecting structure 20 includes a pair of spaced blocks 22, 21 connected by a pair of cylindrical rails 25, 26. Moveable platform 30 is preferably moveable only in the ±x direction along rails 25, 26 on linear bearings (not shown) within platform 30.

As shown in FIG. 2, when left edge 32 of platform 30 abuts block 22, surface under test 80 is operationally aligned with probe 54 of force microscope 52. Platform 30 may be rigidly fastened to block 22 by a screw 24 having threads 28 (FIG. 1) extending into a hole in the center of platform 30. This construction permits surface under test 80 to be repeatedly moved under the probe of force microscope 52 with an accuracy better than 10 microns, or 0.01 mm.

As shown in FIG. 3, platform 30 has been moved to the other end of rails 25, 26 where right edge 31 of platform 30 abuts block 21 and is held in position by threads 29 (FIG. 1) of screw 23 extending into platform 30 from end 31. Surface under test 80 is now operationally aligned with the objective lens 68 of optical microscope 62.

Figure 4:
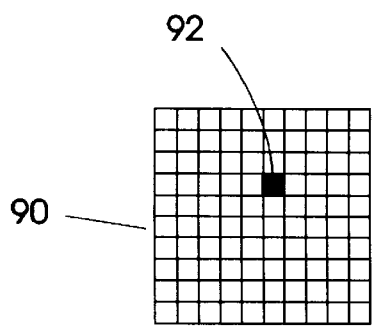
FIG. 4 shows the test reticle used with this invention.

In order for an operator to be able to ascertain which portion of surface under test 80 is being scanned by force microscope 52, the invention is calibrated to ensure that the image through optical microscope 62 corresponds to the image of force microscope 52. Calibration is accomplished with reticle 90, which is shown in FIG. 4 to have a grid of small squares, with one square 92 being subdivided into finer squares. In one test of the invention, reticle 90 was a 10×10 grid of squares having a line height of 25 microns, a line thickness of 20 microns, and an inside dimension for each square of 680 microns. One square 92 was further divided into a 10×10 grid of 60 micron squares by 10 micron lines. However, any reticle design that permits optical and force microscopes to examine the same location may be used.

Figure 5:
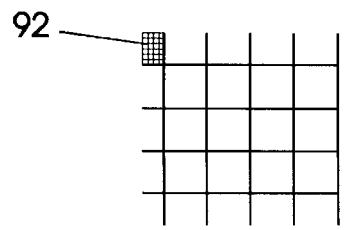
FIG. 5 shows a portion of the test reticle of FIG. 4.

For calibration, reticle 90 is placed on stage 35 as the surface under test and platform 30 is affixed against block 22 as shown in FIG. 2. Force microscope 52 then scans reticle 90 until any portion of square 92 is detected, such as the lower right corner as shown in FIG. 5. The vertical position of probe 54 of force microscope 52 is then noted and retracted, and platform 30 is moved to the other position against block 21 as shown in FIG. 3. The x-y position of optical microscope 62 is then adjusted with x-y stage 72, and the z position adjusted by focusing microscope 62, until the operator sees the same image (such as illustrated in FIG. 5) as was detected by force microscope 52. At this point, the position of the two microscopes is calibrated, and neither the 3-dimensional position of optical microscope 62 (by movement of x-y stage 72 or adjustment of the focus of the microscope) nor the position of force microscope 52 (by movement of platform 40) should be changed. While the position of platform 40 on a kinematic mount is quite repeatable, it is not repeatable within the accuracy of force microscope 52.

An advantage of this invention over the system of Yasutake in the aforementioned U.S. Pat. No. 5,650,614 should now be apparent. Yasutake assumes the optical microscope covers the same area as the probe of the force microscope; this invention ensures that the position and focus of the optical microscope is calibrated to the tip of the force microscope.

After calibration, reticle 90 is replaced on x-y-z stage 35 by an actual subject under test. The position of subject under test 80 is then moved by x-y-z stage 35 until the portion of subject under test 80 to be scanned by force microscope 52 is visible and focused under optical microscope 62. Platform 30 is then moved back to the position of FIG. 2. Because of the 3-dimensional calibration, probe 54 can now quickly approach and detect the sample surface, eliminating the time consuming repetitive approach and withdrawal steps that are required to place a force microscope tip near a surface. A normal scan is then made with force microscope 52 of the portion of subject under test 80 that was previously located by optical microscope 62.

Because of the extreme magnification of the force microscope, care must be taken to ensure that the subject under test is in the same exact position under each microscope. One practice is to maintain the system in an atmosphere of controlled heat and minimum vibration, and to construct positioner 5 from rigid materials having a very low coefficient of thermal expansion, such as Invar, a low expansion alloy consisting of about 36% nickel and the balance mostly iron. Furthermore, threads 28 and 29 preferably extend about half way into platform 30 to provide an even distribution of force throughout the platform, thereby minimizing distortion of platform 30. In addition, the kinematic mount for platform 40 is not touched once the calibration process begins, as the repeatability of a kinematic mount is not equal to the resolution of force microscope 52.

An alternative embodiment of the invention is shown in FIG. 6 to include a base 120 having secured thereto a fixed platform 130 that includes an x-y-z stage 135 holding object under test 180. For this embodiment, optical microscope 162 is affixed to a microscope platform 170 by an x-y stage 172. Microscope platform 170 is accurately positioned relative to base 120 by three legs (of which 174 and 176 are visible in the figure) which extend to a kinematic mount with grooves (of which only 116, which groove holds the third leg, is visible).

As shown in FIG. 7, force microscope 152 for the alternative embodiment of FIG. 6 is carried by a platform 142 which has legs 144, 146, 148 which form a kinematic mount with the same grooves in platform 120 used by optical microscope 162. The similar platform structures enable force microscope 152 and optical microscope 162 to be accurately and alternatively positioned at the same location relative to platform 142.

In operation, force microscope 152 is positioned over platform 130 by the kinematic mount and test reticle 90 is scanned until a distinguishing characteristic, such as an edge of one square 92, is detected. Platform 142 is then removed and platform 170 containing optical microscope 162 is positioned over platform 130 by the kinematic mount. The position of optical microscope 162 is adjusted using x-y stage 172 until the optical image is the same as that detected by force microscope 152. As in the other embodiment, reticle 90 is replaced by object under test 180 and the x-y-z stage 135 is adjusted until the desired portion of object under test 180 is in the optical field of view. Optical platform 170 is then replaced by platform 142, and the desired portion of object under test 180 is viewed by force microscope 152.

The precision of this embodiment depends on the repeatability of the placement of the platforms, which is a function of the precision of the kinematic mounts. While the precision of this embodiment would not be as high as the first embodiment, it does offer the advantage of minimal moving parts. It also offers the advantage over the system of the aforementioned U.S. Pat. No. 5,689,063 of Fujiu of being able to calibrate the view of the optical system to the view of the force microscope.

The particular sizes and equipment discussed above are cited merely to illustrate a particular embodiment of this invention. It is contemplated that the use of the invention may involve components having different sizes and shapes as long as the principle, firmly fixing an optical and a force microscope at spaced locations, and calibrating a test fixture so the same view is seen by both microscopes, is followed. For example, base 10 does not have to be planar and either microscope could be cantilevered over the subject under test. It is intended that the scope of the invention be defined by the claims appended hereto.

What is claimed is:

1. A method for positioning an area of interest relative to a first device comprising:
   placing a calibration object having an identifiable characteristic on a viewing stage on a platform;
   aligning the object with the first device;
      producing an image of the identifiable characteristic with the first device;
   aligning the object with a second device;
      moving only the second device until the second device produces an image of the identifiable characteristic that matches the image from the first device;
   replacing the calibration object on the viewing stage with a test object;
      moving only the viewing stage until the second device produces an image of the area of interest;
   aligning the first device with the object; and
      producing an image of the area of interest with the first device.

2. The method of claim 1 wherein the first position and the second position are identical, each of the devices being removable from and replaceable at the first and second positions.

3. The method of claim 2 wherein the first device is one of the group consisting of an interfacial force microscope and an atomic force microscope, and the second device is an optical microscope.

4. The method of claim 3 where the viewing stage is moved by an x-y-z translation stage.

5. The method of claim 4 wherein the second device is affixed to an x-y translation stage.

6. The method of claim 2 wherein each of the first and second devices is aligned in position by a kinematic mount.

7. The method of claim 1 wherein object is on a surface that is movable between spaced first and second positions.

8. The method of claim 7 wherein the surface moves only along a linear path between the first and second positions, and the steps of placing the surface in the first and second positions include fastening the surface against first and second blocks, respectively, at the ends of the linear path between the positions.

9. The method of claim 8 wherein the surface is fastened against the first and second blocks by screwing the surface to the respective block.

10. A method for positioning a first device at an area of interest comprising:
    placing a calibration object having an identifiable characteristic on a viewing stage of a movable surface, the surface being movable between a first position where the viewing stage is in operational alignment with the first device and a second position where the viewing stage is in operational alignment with a second device;
    placing the movable surface in the first position;
       producing an image of the identifiable characteristic with the first device;
    placing the surface in the second position;
       moving only second device until an image of the identifiable characteristic in the second device matches the image from the first device;
    replacing the calibration object on the stage of the surface with a test object;
       moving only the viewing stage relative to the movable surface until the second device images the area of interest;
    placing the surface in the first position; and
       scanning the test object with the first device to image the area of interest.

11. The method of claim 10 wherein the surface moves only linearly between the first and second positions, and the steps of placing the surface in the first and second positions include fastening the surface against first and second surfaces, respectively, at the ends of the linear path between the positions.

12. The method of claim 10 wherein the second device is an optical microscope.

13. The method of claim 12 wherein the first device is one of the group consisting of an interfacial force microscope and an atomic force microscope.

14. The method of claim 10 wherein the second device is affixed to an x-y translation stage for movement relative to the calibration object.

15. The method of claim 10 wherein the viewing stage is connected to the moveable surface by an x-y-z translation stage.

16. The method of claim 10 further comprising fastening the moving surface against a first stop block when the moving surface is at the first location.

17. The method of claim 16 further comprising fastening the moving surface against a second stop block when the moving surface is at the second location.

18. The method of claim 17 wherein said moving surface is fastened against the first and second stop blocks by screwing the surface to the respective block.

19. An apparatus for positioning a first device at an area on interest comprising:

a base, a first device at a first location on said base;

a second device mounted on said base by a device translation stage at a second location, said device translation stage providing for incremental movement of said second device parallel to said base;

a moveable platform having a viewing translation stage for movement relative to said surface;

means for selectively positioning said platform with said viewing stage either in operational communication with the first device at the first location or with the second device at the second location.

20. The apparatus of claim 19 wherein said first device is a force microscope.

21. The apparatus of claim 20 wherein said second device is an optical microscope.

22. The apparatus of claim 19 further comprising at least one rail extending from said first location to said second location, said moveable platform moving along said rail.

23. The apparatus of claim 22 further comprising a first block at said first location and a second block at said second location, said moveable platform having a first side in contact with said first block when said moveable platform is at the first location, said moveable platform further having a second side in contact with said second block when said moveable platform is at the second location, said rail extending from said first block to said second block.

24. The apparatus of claim 23 further comprising first means for fastening said first side of said moveable platform to said first block and second means for fastening said second side of said moveable platform to said second block.

25. The apparatus of claim 24 wherein each of said first and second means for fastening comprises a screw extending through said block and into said platform when said platform is in the first and second locations, respectively.

* * * * *